Oct. 25, 1927.                                                      1,646,418
                         W. H. OPITZ
                    HIGH PRESSURE HAND GUN
                    Filed June 25, 1926
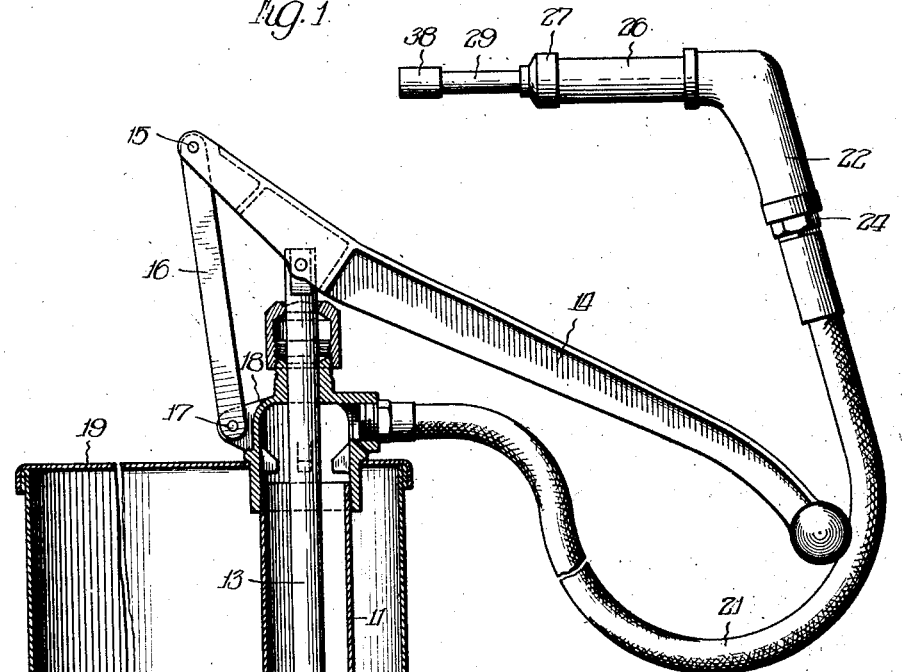
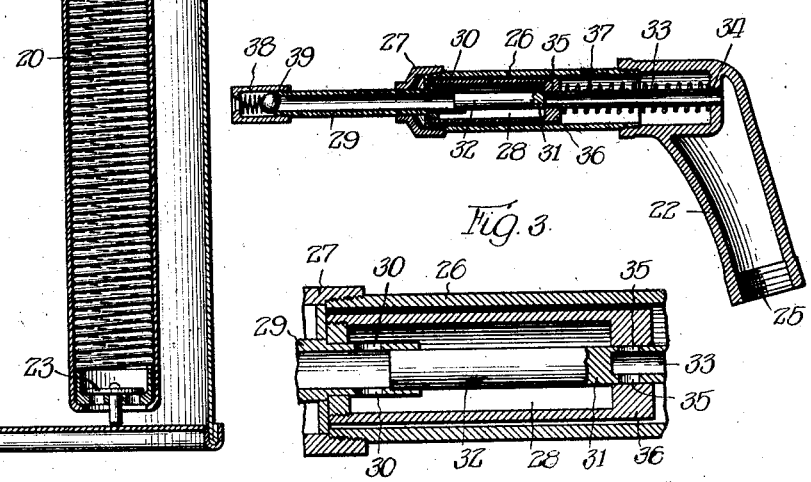
Witness:
R. Burkhardt
Inventor:
William H. Opitz,
By Wilkinson, Huxley, Byron & Knight
                                    Attys Patented Oct. 25, 1927.

1,646,418

UNITED STATES PATENT OFFICE.

WILLIAM H. OPITZ, OF CLEVELAND, OHIO, ASSIGNOR TO THE MARVEL EQUIPMENT COMPANY, OF CLEVELAND, OHIO, A CORPORATION OF OHIO.

HIGH-PRESSURE HAND GUN.

Application filed June 25, 1926. Serial No. 118,406.

This invention relates to lubricating means and more particularly to means for supplying lubricant under a relatively high pressure to bearings and various other parts of an automobile or the like.

One object of the invention is to provide a simple, reliable, efficient and preferably portable lubricating device by means of which a lubricant may be forced into bearings offering high resistance to passage of the lubricant.

Another object is to provide a lubricating device comprising a low pressure lubricant supplying means and a communicating high pressure lubricant supplying means in which leakage of grease from the high pressure means is prevented when the device is not in use.

Another object is to provide a high pressure grease gun which is simple and efficient and adapted to meet the various requirements under service conditions.

These and other objects are accomplished by means of the arrangement disclosed on the accompanying sheet of drawings, in which—

Figure 1 is a vertical longitudinal sectional view of a low pressure lubricant supplying means in combination with a high pressure lubricant supplying means shown in side elevation and embodying my invention;

Figure 2 is a vertical sectional view through the high pressure lubricant supplying means; and Figure 3 is a fragmentary enlarged detail sectional view showing the control means whereby the flow of lubricant is controlled through said high pressure lubricant supplying means.

The various novel features of the invention will be apparent from the following description and drawings, and will be particularly pointed out in the appended claims.
The invention is illustrated in connection with a lubricant or grease kit including a drum 10 containing lubricant which is to be pumped through various pressure stages into bearings and the like offering high resistance to the passage of the lubricant. Mounted in the drum 10 is a cylinder 11 of the low pressure pump in which a valved piston 12 is mounted for vertical reciprocatory movement. The piston is provided with a rod 13 connected at its upper end to a handle or lever 14 having one of its ends pivotally connected at 15 to one end of a link 16, the other end of which link is pivotally connected at 17 to the cap 18 of the pump cylinder 11 which cap preferably fits into the cover 19 of the drum 10. While the piston 12 is forced downwardly by a downward stroke of the handle 14 for permitting a flow of lubricant up through the ported piston 12, a coiled spring 20 located below the piston and within the cylinder 11 is compressed. When the handle 14 is released, the coiled spring 20 presses the lubricant above the piston with a pressure of about one hundred pounds per square inch, up and out through the upper end of the cylinder 11, through the hose 21 connected to the cylinder cap 18, and into the hollow handle 22 of the high pressure grease gun. During the upper stroke of the piston 12, grease will be drawn past the valve 23 in the bottom of the pump cylinder 11 and into the cylinder to form the next charge of lubricant to be forced up through the piston 12 upon the next downward stroke of the latter.

The hose 21 is connected to the hollow handle of the high pressure grease gun in any suitable manner but preferably by a nut 24 cooperating with internal threads 25 at the lower end of the handle 22. Connected to the handle of the grease gun is a grease gun barrel 26, the opposite end of which is provided with a packing gland 27. Movably mounted within the barrel is a hollow shell 28 through which lubricant may pass. Rigidly secured to the shell 28 at its forward end is a discharge nozzle 29 having a plurality of ports 30 through which lubricant may flow from the shell into the discharge nozzle. Cooperating with the discharge nozzle 29 and shell 28 is a plunger 31 having a solid portion 32 which is operable in the nozzle for controlling the ports 30 and the discharge under relatively high pressure of lubricant from the discharge nozzle 29. The plunger 31 also has a hollow portion 33, the open end of which is preferably screwed into an interior wall 34 within the handle 22 and has open communication with the hollow portion of the handle 22 whereby lubricant may be forced from said handle through the hollow portion 33 of the plunger. The hollow portion of the plunger 33 is provided with a plurality of ports 35, through which, under certain conditions, lubricant may flow from the hollow plunger 33 into the shell 28. Normally, however, when the high pressure gun is not in use, the ports 35 are covered by the enlarged base portion 36 of the shell 28, as shown in Figure 2, the shell being held in such covering position or in the forward end of the barrel 26 by a coiled spring 37 which is coiled around the hollow portion 33 of the plunger 31. Accordingly, as shown in Figure 2, oil is prevented from flowing from the handle 22 through the hollow portion 33 of the plunger to the shell 28, but in view of the fact that the ports 30 in the discharge nozzle are open, lubricant may flow from the shell 28 into said discharge nozzle 29 which, of course, occurs as soon as the ports 30 are uncovered by the plunger due to a certain amount of suction which is created within the discharge nozzle upon the withdrawal of the plunger toward the rear of the discharge nozzle 29.

When it is desired to lubricate a bearing, the tip end 38 of the grease gun is placed against any suitable nipple and forward pressure applied to the handle 22 of the grease gun which causes the barrel 26 and plunger 31 to move forwardly with respect to the discharge nozzle 29 and the shell 28, or in other words, causes the discharge nozzle 29 to telescope inwardly with respect to the barrel 26 and the shell 28 to move rearwardly within the barrel 26. During this movement lubricant which had been drawn into the discharge nozzle is forced outwardly therefrom under high pressure as a result of the action of the plunger 31, and at the same time the ports 35 are uncovered for permitting the flow of lubricant from the hollow handle 22 through the hollow portion 33 of the plunger 31 and into the shell 28. During this action it will be appreciated that the coiled spring 37 is compressed. When pressure on the handle 22 is released, the handle 22 and the barrel 26 and plunger 31, under pressure of spring 37, will be moved in an opposite direction to assume the position shown in Figure 2, in which position further flow of lubricant through the hollow portion 33 of the plunger 31 into the shell 28 is prevented and the flow of lubricant from the shell 28 into the discharge nozzle 29 is permitted. It will be understood, of course, that when the grease gun is not in use the discharge end will be normally closed by the spring-pressed ball valve 39 to prevent leakage.

By means of this arrangement the objects of the invention are accomplished.

I claim:

1. A high pressure lubricant gun comprising a barrel, a shell for containing lubricant mounted in said barrel, a discharge nozzle connected to said shell and having ported communication with said shell, and a plunger having a portion through which lubricant is conveyed into said shell and having another portion operable in said discharge nozzle for forcing lubricant therefrom.

2. A high pressure lubricant gun comprising a barrel, a shell for containing lubricant mounted in said barrel, a discharge nozzle connected to said shell and having ported communication with said shell, and a plunger for controlling the supply of lubricant to said shell and for discharging lubricant under pressure from said discharge nozzle.

3. A high pressure lubricant gun comprising a barrel, a shell for containing lubricant mounted in said barrel, a discharge nozzle connected to said shell and having ported communication with said shell, and means for controlling the supply of lubricant to said shell and for discharging lubricant under pressure from said discharge nozzle.

4. A high pressure lubricant gun comprising a barrel, a shell for containing lubricant movably mounted in said barrel, a discharge nozzle connected to said shell and telescopically arranged with respect to said barrel and having ported communication with said shell, and a plunger having a portion through which lubricant is conveyed into said shell, and having another portion operable in said discharge nozzle for forcing lubricant therefrom.

5. A high pressure lubricant gun comprising a barrel, a shell for containing lubricant movably mounted in said barrel, a discharge nozzle connected to said shell and telescopically arranged with respect to said barrel and having ported communication with said shell, a plunger having a portion through which lubricant is conveyed into said shell and having another portion operable in said discharge nozzle for forcing lubricant therefrom, and means for normally holding the discharge nozzle in its outermost position with respect to said barrel.

6. A high pressure lubricant gun comprising a barrel, a shell for containing lubricant movably mounted in said barrel, a discharge nozzle connected to said shell and telescopically arranged with respect to said barrel and having a port through which lubricant may be drawn from said shell into said discharge nozzle, and a plunger having a port through which lubricant may be supplied to said shell which port is closed when the plunger is in one position with respect to said shell and open when in a different position with respect to said shell, said plunger having a portion operable in said discharge nozzle for forcing lubricant therefrom.

7. A high pressure lubricant gun comprising a barrel, a shell for containing lubricant movably mounted in said barrel, a discharge nozzle connected to said shell and telescopically arranged with respect to said barrel and having a port through which lubricant may be drawn from said shell into said discharge nozzle, a plunger having a port through which lubricant may be supplied to said shell, which port is closed when the plunger is in one position with respect to said shell and open when in a different position with respect to said shell, said plunger having a portion operable in said discharge nozzle for forcing lubricant therefrom, and means operable upon said shell for holding said shell, plunger and discharge nozzle in a given relative position.

8. A high pressure lubricant gun comprising a barrel, a shell for containing lubricant movably mounted in said barrel, a discharge nozzle connected to and communicating with said shell, and a plunger extending into and cooperating with means in said shell and discharge nozzle whereby the supply of lubricant to said shell is controlled by said plunger, and the discharge of lubricant from said discharge nozzle is controlled by said plunger.

9. A high pressure lubricant gun comprising a barrel, a shell movably mounted in said barrel, a discharge nozzle having communication with said shell, and means having different portions for controlling the supply of lubricant into said shell and from said shell into said discharge nozzle, and the discharge from the latter.

10. A high pressure lubricant gun comprising a barrel having a handle for containing and transmitting a lubricant, a shell movably mounted in said barrel, a discharge nozzle connected to said shell having communication therewith, and a plunger having a hollow portion through which a lubricant may be supplied from said hollow handle to said shell, said plunger controlling the flow of liquid from said handle to said shell and from said shell to said discharge nozzle.

11. A high pressure lubricant gun comprising a barrel having a handle for containing and transmitting a lubricant, a shell movably mounted in said barrel, a discharge nozzle connected to said shell having communication therewith, a plunger having a hollow portion through which a lubricant may be supplied from said hollow handle to said shell, said plunger controlling the flow of liquid from said handle to said shell and from said shell to said discharge nozzle, and means operable upon said shell normally for holding the shell in a position to prevent flow of lubricant from said handle to said shell and to permit the flow of lubricant from said shell to said discharge nozzle.

12. A high pressure lubricant gun comprising a barrel having a handle having a passage therein communicating with said barrel and into which lubricant is fed, a shell slidably mounted in said barrel and provided with a discharge nozzle having means communicating with said shell, and a plunger extending into said nozzle and barrel and controlling the discharge of lubricant from said nozzle and having means cooperating with said shell for controlling flow of lubricant into said shell.

13. In a high pressure grease gun, the combination of a discharge nozzle communicating with a shell movably mounted in a barrel, and means communicating with a source of grease, cooperating with a part of said nozzle and having an opening controlled by said movable shell for controlling the flow of grease into and out of said nozzle from said source and shell.

14. In a high pressure grease gun, the combination of a barrel, a shell having a discharge nozzle movably mounted in said barrel, and means controlled by the movement of the shell for introducing grease into said shell, said means controlling the introduction of grease to and expulsion of grease from said nozzle.

Signed at Cleveland, Ohio, this twenty-first day of June, 1926.

WM. H. OPITZ.